(No Model.)
C. C. CONROY.
PROTECTOR FOR JAWS OF WRENCHES.
No. 448,124. Patented Mar. 10, 1891.
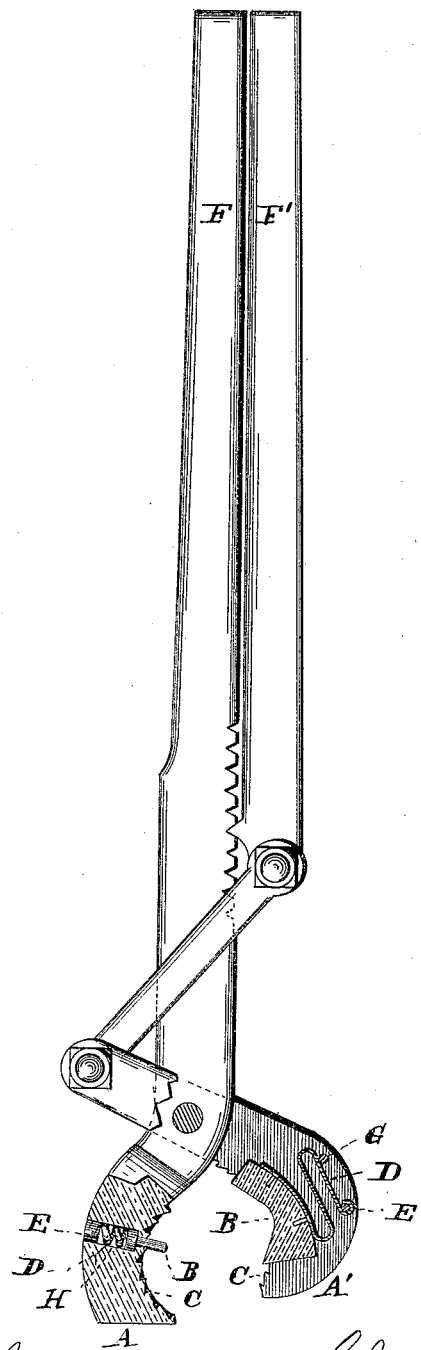
Witnesses:
Inventor:
Charles C. Conroy
by Michael J. & Wm. O. Stark,
Attorneys.

UNITED STATES PATENT OFFICE.

CHARLES C. CONROY, OF BUFFALO, NEW YORK.

PROTECTOR FOR JAWS OF WRENCHES.

SPECIFICATION forming part of Letters Patent No. 448,124, dated March 10, 1891.

Application filed December 18, 1890. Serial No. 375,080. (No model.)

*To all whom it may concern:*

Be it known that I, CHARLES C. CONROY, of Buffalo, in the county of Erie and State of New York, have invented certain new and useful Improvements in Carriers and Protectors for the Jaws of Pipe-Wrenches, Pipe-Tongs, and Similar Tools; and I do hereby declare that the following description of my said invention, taken in connection with the accompanying drawing, forms a full, clear, and exact specification, which will enable others skilled in the art to which it appertains to make and use the same.

This invention has general reference to improvements in pipe-wrenches and pipe-tongs, whereby this class of tools when in use are lifted from contact with the pipe on the return-stroke, as will hereinafter more fully appear.

In the drawing already mentioned, which serves to illustrate my said invention more fully, the figure is a plan of one of many kinds of pipe-tongs and pipe-wrenches supplied with my novel means for lifting the biting tooth, teeth, or jaws from the pipe on the return stroke or movement of the tongs, wrench, or similar tool.

The object of my invention is the production of a simple and efficient device to be used on pipe-tongs, pipe-wrenches, and similar tools, whereby the biting jaw, tooth, teeth, or other means for engaging the pipe are lifted from contact with the pipe on the return stroke or movement of the tool, so that wear upon the same is reduced to a minimum.

It is a well-known fact that in pipe-tongs and pipe-wrenches the "bite," be it a series of teeth, a single jaw, or tooth, or other analogous means for engaging the pipe, is soon worn out, owing to the fact that grit, dirt, sand, and scale upon the pipe causes the abrasion of such tooth or teeth principally on the return-stroke when such teeth slide or move over the surface of the pipe and in contact therewith, it being an established fact that such teeth or a single tooth may be worn sufficiently in a working day to render the pipe-tongs or pipe-wrench practically useless until its teeth or bite have been sharpened. To overcome this serious objection I locate in the jaw or jaws A A' of a pipe-wrench or pipe-tongs and similar device or tool a carrier B, the bearing surface or point of which is located above the point or points C of the biting tooth or teeth, said carrier being sustained in position by a spring or springs D, properly fastened in the jaw or jaws A A' by a screw, pin, or rivet E. This construction, however, may have to be modified to adapt it for use in different pipe-tongs and pipe-wrenches, which modifications are of but minor details and within the province of the skilled mechanic.

In the drawing I have illustrated two methods of accomplishing the object in view. In the jaw A', which is presumed to be a pair located at a suitable distance from each other, the carrier B is placed between these jaws. The spring D is fastened with one end to the carrier and with its other end to the pin E, passing through the jaws, a stop G limiting to some extent the movement of said spring. The bearing-surface of the carrier is curved to adapt it to ride and properly guide the tool upon a pipe, rod, or the like object upon which the pipe-wrench or pipe-tongs are to be used, while in the jaw A, which is presumed to be a single jaw, a hole H is bored, through which is passed a headed pin B, the spiral spring D acting upon the head to push the pin outwardly, said spring being held within the hole by the plug E in an obvious manner. Of course other similar means in great number may be devised to accomplish the desired result without departing from my invention. It will now be observed that if the spring or springs D be made strong and stiff enough to carry the weight of the tongs or wrench or other implement in connection with which it is being used the carrier will allow the tongs or wrench to be rotated around the pipe without the bite C of the same coming in contact with said pipe, thus avoiding all wear upon the same, while as soon as the jaws A A' are closed upon the pipe by drawing the handles F F' together or by otherwise properly manipulating the pipe-wrench or pipe-tongs the carrier will be depressed to allow the bite to come in contact with the pipe in the usual manner. This device is of the greatest importance in pipe-wrenches and pipe-tongs, and its application thereto overcomes one of the most serious objections now existing in this class of tools and implements.

The device can be readily manufactured and applied to all kinds and styles of pipe-tongs and pipe-wrenches at a small cost, which will be saved many times over in course of time.

Having thus fully described my invention, I claim as new and desire to secure to me by Letters Patent of the United States—

1. In a pipe-wrench and pipe-tongs, a movable carrier having its bearing-surface above the plane of the bite of said tongs or wrench and adapted to be depressed, as and for the object stated.

2. In a pipe-tongs and pipe-wrench, a spring-carrier having its bearing-surface above the plane of the bite of said tongs or wrench and adapted to be depressed by the application of the tool, as and for the purpose stated.

3. In a pipe-tongs and pipe-wrench, the combination, with the jaw having the bite, as described, of a carrier having its bearing-surface normally located above the plane of the bite and a spring arranged to act upon said carrier to retain and return it to its normal position, as stated, whereby the carrier is depressed by the application of the tool upon a pipe or rod, as and for the purpose specified.

4. In a pipe-tongs and pipe-wrench, the combination, with the jaw A, of the hole H therein, the headed pin B in said hole and projecting from the inner bite of said jaw, the spiral spring acting upon the head of said pin B, and the plug E, as and for the object specified.

In testimony that I claim the foregoing as my invention I have hereto set my hand in the presence of two subscribing witnesses.

C. C. CONROY.

Attest:
MICHAEL J. STARK,
WM. O. STARK.